United States Patent
Wahrenberg

(10) Patent No.: US 10,762,693 B2
(45) Date of Patent: Sep. 1, 2020

(54) IMAGING DATA PROCESSING APPARATUS AND METHOD

(71) Applicant: Canon Medical Systems Corporation, Otawara-shi (JP)

(72) Inventor: Magnus Wahrenberg, Edinburgh (GB)

(73) Assignee: Canon Medical Systems Corporation, Otawara-shi (JP)

( * ) Notice: Subject to any disclaimer, the term of this patent is extended or adjusted under 35 U.S.C. 154(b) by 226 days.

(21) Appl. No.: 15/946,311

(22) Filed: Apr. 5, 2018

(65) Prior Publication Data

US 2019/0311530 A1 Oct. 10, 2019

(51) Int. Cl.
| | |
|---|---|
| G06K 9/00 | (2006.01) |
| G06T 15/50 | (2011.01) |
| G06T 7/90 | (2017.01) |
| G06T 7/00 | (2017.01) |
| G06T 15/80 | (2011.01) |
| G06T 5/00 | (2006.01) |

(52) U.S. Cl.
CPC ............ *G06T 15/506* (2013.01); *G06T 5/002* (2013.01); *G06T 7/0012* (2013.01); *G06T 7/90* (2017.01); *G06T 15/80* (2013.01); *G06T 2207/20016* (2013.01); *G06T 2207/30008* (2013.01)

(58) Field of Classification Search
None
See application file for complete search history.

(56) References Cited

U.S. PATENT DOCUMENTS

| 9,384,548 | B1 | 7/2016 | Wahrenberg |
| 9,659,405 | B2 | 5/2017 | Wahrenberg |
| 2008/0259080 | A1 | 10/2008 | Masumoto et al. |
| 2015/0193961 | A1 | 7/2015 | Nakagawa et al. |
| 2016/0005218 | A1 | 1/2016 | Day et al. |
| 2016/0292913 | A1* | 10/2016 | Wahrenberg ............ G06T 15/08 |
| 2018/0061111 | A1* | 3/2018 | Engel ..................... G06T 15/06 |

FOREIGN PATENT DOCUMENTS

JP 2006-338 A 1/2006

OTHER PUBLICATIONS

Rousselle, F. et al. "Adaptive Rendering with Non-Local Means Filtering", ACM Transactions on Graphics. vol. 31, No. 6, Article 195, Nov. 2012, 11 pages.

* cited by examiner

*Primary Examiner* — Wei Wen Yang
(74) *Attorney, Agent, or Firm* — Oblon, McClelland, Maier & Neustadt, L.L.P.

(57) ABSTRACT

An image processing apparatus comprises processing circuitry configured to: obtain an irradiance volume representative of virtual light cast into a volumetric imaging data set, the irradiance volume comprising a respective irradiance value for each of a plurality of points in the irradiance volume; determine, for each of a plurality of reference points in the irradiance volume, a respective value for an accuracy measure, wherein the value for the accuracy measure at each reference point is representative of an accuracy with which irradiance has been determined at or near that reference point; and perform a rendering process using the irradiance volume, wherein the rendering process is performed in dependence on the determined values for the accuracy measure.

18 Claims, 8 Drawing Sheets

IMAGING DATA PROCESSING APPARATUS AND METHOD

FIELD

Embodiments described herein relate generally to a method of, and apparatus for, image processing, for example a method of filtering an image using a measure of lighting accuracy.

BACKGROUND

It is known to render a volumetric imaging data set to produce a rendered image in which a subject of the image appears to be three-dimensional. The volumetric imaging data set may comprise a three-dimensional array of voxels, each with an associated intensity. The rendered image may comprise a two-dimensional array of pixels. The rendered image may sometimes be referred to as a 3D image because of the three-dimensional appearance of the subject in the rendered image.

In the context of medical imaging, a volumetric imaging data set may be obtained directly from a medical imaging scan or through further processes such as reconstruction and filtering. The intensities of the voxels of the volumetric imaging data may correspond to physical properties of the subject of the scan, for example tissue types. The intensities may be mapped on to opacity and color values, for example by using a transfer function. The opacity and color values may then be used in the rendering process, for example to distinguish different tissue types by rendering them in different colors.

Lighting effects may be added to a 3D image such that the subject of the image appears to be illuminated from a given position and/or direction. In recent years, 3D medical images have been made more realistic through the use of advanced lighting techniques (referred to as global illumination, gradient free lighting, subsurface scattering or photon mapping) that simulate illumination with a more physically accurate model than was previously used.

In Global Illumination (GI), a lighting model may be used that includes both direct illumination by light coming directly from a light source and indirect illumination, for example illumination by light that has been scattered from another surface.

A global illumination imaging algorithm may be divided up into two passes. The first pass is a forward simulation of light into the volume. Light information is stored in an intermediate volumetric structure, which may be referred to as a light volume or irradiance volume. The second pass traces light backwards from a camera. The second pass uses the light information in the light volume to render an image for display.

A two-pass system may allow a single light volume to be used for multiple rendering passes at different viewing angles, thus avoiding the need to recalculate the light volume for each render.

In an example of a GI imaging algorithm, the position of at least one light source is determined with reference to a volumetric imaging data set. In a first pass, virtual light is cast from the at least one light source into the volumetric imaging data set using a global illumination lighting model. The virtual light may be referred to in terms of photons or photon rays. The first pass may be referred to as a photon mapping pass.

The irradiance due to the at least one light source is determined at each of a large array of points in the volumetric imaging data set using absorptive properties assigned to the voxels in dependence on the voxel intensities. The irradiance values at the array of points are stored as a light volume, which may be also be referred to as an irradiance volume. The irradiance volume is representative of light cast into the volumetric imaging data set. The irradiance of each voxel in the light volume is determined by the number of photons that passes through the voxel.

The position of a viewpoint (which may be referred to as a camera) is determined. In a second pass, rays are cast from the camera into the irradiance volume (for example, one ray for each pixel of the resulting rendered image). Irradiances from points along each ray are integrated to provide pixel color values for a final rendered image.

Many global illumination algorithms use stochastic lighting simulation in an attempt to reduce or eliminate structured artefacts. In the first pass of the global illumination method, photons may be sent into the volume in accordance with a stochastic distribution. Optionally, the second pass of the global illumination method may also use stochastic simulation.

In some circumstances, stochastic simulation may introduce grainy noise into an image, which may result in a speckled appearance of the final image. Grainy noise may be unpleasant for a viewer. In some circumstances, grainy noise may make it more difficult for a viewer to interpret an image. For example, in a series of images that show a moving subject, the positioning of the grainy noise may shift from one image to the next in an unpredictable manner, which may be distracting to the viewer.

Grainy noise may be particularly prevalent in areas of an image that correspond to regions of the irradiance volume that were intersected by a relatively low number of photon rays. For example, some regions may be intersected by a low number of photon rays due to shadowing. Some regions may by intersected by a low number of photon rays due to scattering effects, for example multiple scattering.

One method of reducing grainy noise is to run the lighting simulation for a large number of iterations. FIGS. 1a, 1b and 1c are renderings of the same volumetric imaging data set using a different number of photon mapping passes. FIG. 1a uses one photon mapping pass. FIG. 1b uses two photon mapping passes. FIG. 1c uses 32 photon mapping passes.

In each photon mapping pass, photons of virtual light are distributed in a uniform but stochastic pattern across the footprint of the volume projected into the space of the light. The number of photon rays that are sent into the volume scales with the number of photon mapping passes. It may be expected that over multiple passes, the number of photon rays increases even in regions for which the number of intersecting photon rays is relatively low.

It may be seen from FIGS. 1a, 1b and 1c that the amount of grainy noise in the image decreases with an increased number of photon mapping passes. FIG. 1b has less grainy noise than FIG. 1a. FIG. 1c has less grainy noise than FIG. 1b. Each of FIGS. 1a, 1b and 1c comprises an insert showing an enlarged portion of the image, to better show the grainy noise.

It may be possible to reduce the grainy noise by running a number of iterations, for example until the result converges. However, running a large number of iterations may not be practical with regard to time and/or cost. Furthermore, it may be the case that a large proportion of the information available is obtained in the first iteration or first few iterations. Increasing the number of iterations may in some circumstances incur additional time and cost without resulting in much additional information.

Depending on stochastic parameters, the radiance reflected to the camera may be seen as samples of a radiance distribution. Filtering may be used as a tool for smoothing the distribution.

In many algorithms, filtering is performed as a post-processing pass on the rendered image. Such filtering is performed on the two-dimensional array of pixels of the rendered image rather than on a three-dimensional volume. Filtering of the two-dimensional array of pixels of the rendered image may be fast. Filtering of the rendered image may mean that the filtering only operates on the parts of the data that are visible in the image. Filtering only the relevant parts of the data may increase speed and/or decrease complexity of filtering.

It has been found that in some circumstances filtering of the rendered image may be too indiscriminate. In filtering, it may be desirable to remove noise while keeping meaningful features, for example sharply defined structures. It has been found that, in some circumstances, filtering of the rendered image may include filtering (for example, smoothing) of areas in which sharp structures are expected. The appearance of such sharp structures may be smoothed by the filtering in an unwanted manner.

In some circumstances, edge-aware filtering methods may be used to attempt to reduce the unwanted filtering of desired structures. However, in some circumstances even edge-aware filtering methods may filter areas in which filtering has an unwanted effect.

In some circumstances, a non-local means filter may work quite well. However, a non-local means filter may produce a patchy behavior where lighting quality is low.

Filtering of a three-dimensional volume instead of a two-dimensional rendered image is possible. In some methods, the three-dimensional irradiance volume may be filtered. However, in some circumstances, it may be difficult or impossible to filter a three-dimensional volume in real time. For example, a so-called 4D ultrasound image may be updated many times per second. It may not be possible to filter a three-dimensional volume quickly enough to apply such filtering to real time 4D ultrasound images. Some complex filters may take multiple seconds to render a single image.

Furthermore, volumetric filters may be more challenging than two-dimensional filters, especially since the photon data structure (the irradiance volume) may be complex.

FIGS. 2a, 2b and 2c provide a comparison of the same rendered image when different post processing filters are applied to the two-dimensional array of pixels in the rendered image. No filtering is applied to the image of FIG. 2a. Grainy noise is present in the image of FIG. 2a. A medium profile filtering is applied to the image of FIG. 2b. A high profile filtering is applied to the image of FIG. 2c. The image of FIG. 2c is more strongly filtered than the image of FIG. 2b. In the examples of FIGS. 2b and 2c, the filter used is an anisotropic diffusion filter (which is in the category of feature preserving image filters).

It may be seen that, while the filtering reduces the grainy noise, it also reduces a level of detail in the image. For example, a vessel 10 is shown in all three images. The vessel 10 appears less sharp in FIG. 2b than in FIG. 2a. The vessel 10 appears less sharp in FIG. 2c than in FIG. 2b. In the example of FIGS. 2a, 2b and 2c, the definition of detailed features (for example, the vessel 10) is lost before the grainy noise is fully eliminated. In general, definition may be lost before noise is fully resolved. In some circumstances, the noise magnitude may be quite high.

BRIEF DESCRIPTION OF THE DRAWINGS

Embodiments are now described, by way of non-limiting example, and are illustrated in the following figures, in which:

FIG. 5b is an enlarged portion of FIG. 5a;

DETAILED DESCRIPTION

Certain embodiments provide an image processing apparatus comprising processing circuitry configured to obtain an irradiance volume representative of virtual light cast into a volumetric imaging data set, the irradiance volume comprising a respective irradiance value for each of a plurality of points in the irradiance volume; determine, for each of a plurality of reference points in the irradiance volume, a respective value for an accuracy measure, wherein the value for the accuracy measure at each reference point is representative of an accuracy with which irradiance has been determined at or near that reference point; and perform a rendering process using the irradiance volume, wherein the rendering process is performed in dependence on the determined values for the accuracy measure.

Certain embodiments provide an image processing method comprising: obtaining an irradiance volume representative of virtual light cast into a volumetric imaging data set, the irradiance volume comprising a respective irradiance value for each of a plurality of points in the irradiance volume; determining, for each of a plurality of reference points in the irradiance volume, a respective value for an accuracy measure, wherein the value for the accuracy measure at each reference point is representative of an accuracy with which irradiance has been determined at or near that reference point; and performing a rendering process using the irradiance volume, wherein the rendering process is performed in dependence on the determined values for the accuracy measure.

Figure 3:
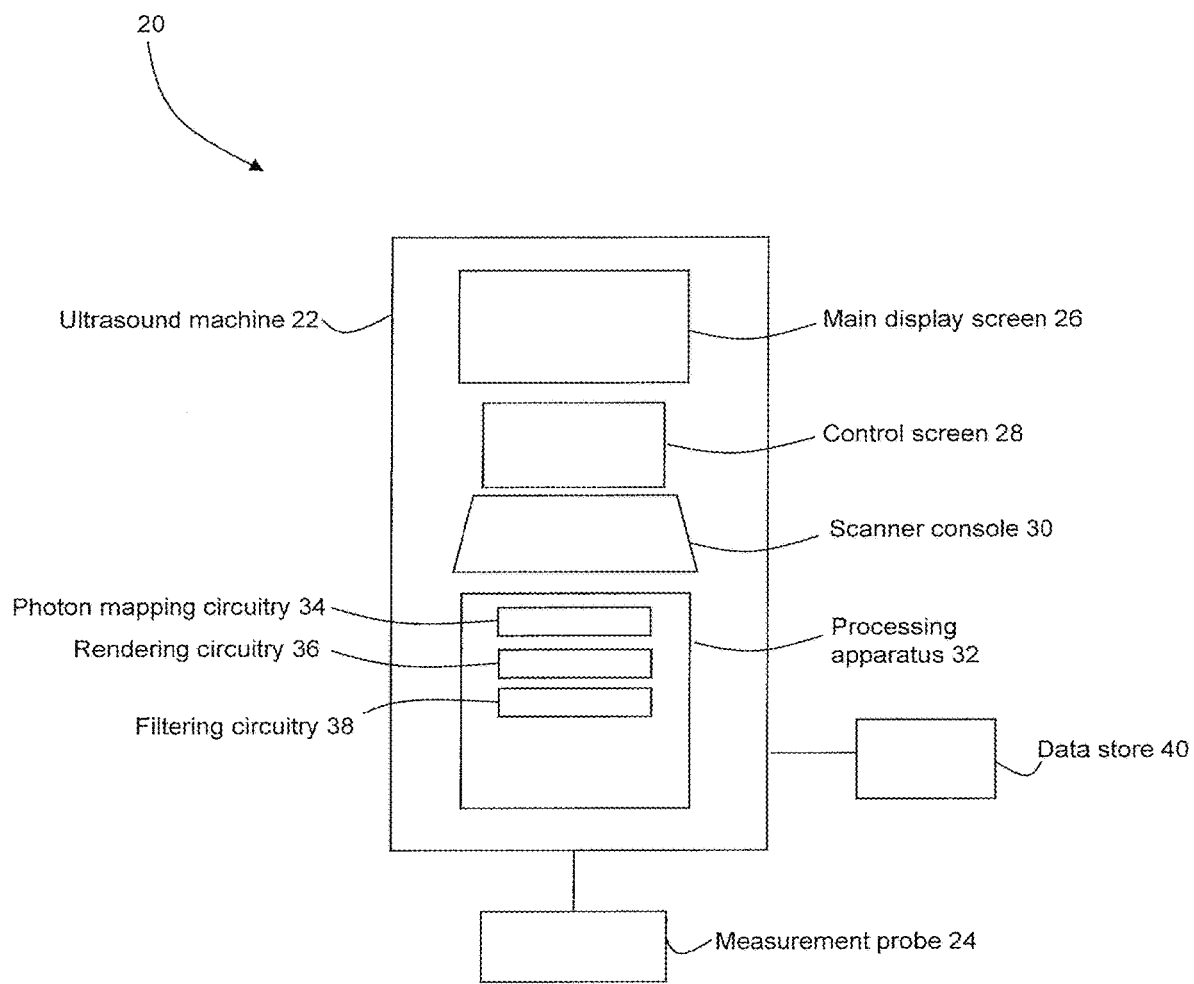
FIG. 3 is a schematic illustration of an apparatus in accordance with an embodiment.

An apparatus 20 according to an embodiment is illustrated schematically in FIG. 3. In the present embodiment, the apparatus 20 is configured to acquire volumetric imaging data from an ultrasound scan, to process the acquired volumetric imaging data and to render an image from the processed volumetric imaging data. In alternative embodiments, an image processing apparatus is configured to receive volumetric imaging data that has previously been acquired by a scanner (for example, an ultrasound scanner, X-ray scanner, computed tomography (CT) scanner, cone-beam CT scanner, magnetic resonance (MR) scanner, positron emission tomography (PET) scanner or single-photon emission computed tomography (SPECT) scanner), to process the received volumetric imaging data and to render an image from the processed volumetric imaging data.

In the present embodiment, the apparatus 20 comprises an ultrasound machine 22 and associated measurement probe 24. Any suitable type of ultrasound machine 22 and measurement probe 24 may be used, for example any ultrasound machine 22 and transducer probe 24 that are configured to obtain ultrasound image data that is suitable for 3D or 4D imaging. In other embodiments the medical diagnostic apparatus 20 may comprise a scanner apparatus of an alternative modality, for example an X-ray scanner, CT scanner, cone-beam CT scanner, MR scanner, PET scanner or SPECT scanner.

The ultrasound machine 22 comprises a main display screen 26 for displaying a main ultrasound image, a control screen 28 for displaying control information, and a scanner console 30. In this embodiment, the scanner console 30 comprises an input device or devices such as input buttons or knobs, a computer keyboard, a mouse or a trackball. In alternative embodiments, the control screen 28 is a touch screen, which is both a display device and a user input device. Further embodiments may comprise a control screen 28, display screen or main display screen 26 that does not form part of the ultrasound machine 22. The ultrasound machine 22 also comprises a data store 40 for storing volumetric imaging data.

The ultrasound machine 22 comprises a processing apparatus 32 for processing of data, including image data. The processing apparatus 32 comprises a Central Processing Unit (CPU) and Graphical Processing Unit (GPU). The processing apparatus 32 includes photon mapping circuitry 34, rendering circuitry 36, and filtering circuitry 38. The photon mapping circuitry 34, rendering circuitry 36, and filtering circuitry 38 may each be implemented in the CPU, in the GPU, or in a combination of the CPU and the GPU.

In alternative embodiments the processing apparatus 32 comprising the photon mapping circuitry 34, rendering circuitry 36, and filtering circuitry 38 may be part of any suitable medical diagnostic apparatus (for example a CT scanner or MR scanner) or image processing apparatus (for example, a PC or workstation). The processing apparatus 32 may be configured to process any appropriate modality of volumetric imaging data, for example ultrasound, X-ray, CT, cone-beam CT, MR, PET or SPECT data.

In the present embodiment, the various circuitries are each implemented in the CPU and/or GPU of processing apparatus 32 by means of a computer program having computer-readable instructions that are executable to perform the method of the embodiment. However, in other embodiments each circuitry may be implemented in software, hardware or any suitable combination of hardware and software. In some embodiments, the various circuitries may be implemented as one or more ASICs (application specific integrated circuits) or FPGAs (field programmable gate arrays).

The processing apparatus 32 also includes a hard drive and other components including RAM, ROM, a data bus, an operating system including various device drivers, and hardware devices including a graphics card. Such components are not shown in FIG. 3 for clarity.

Figure 4:
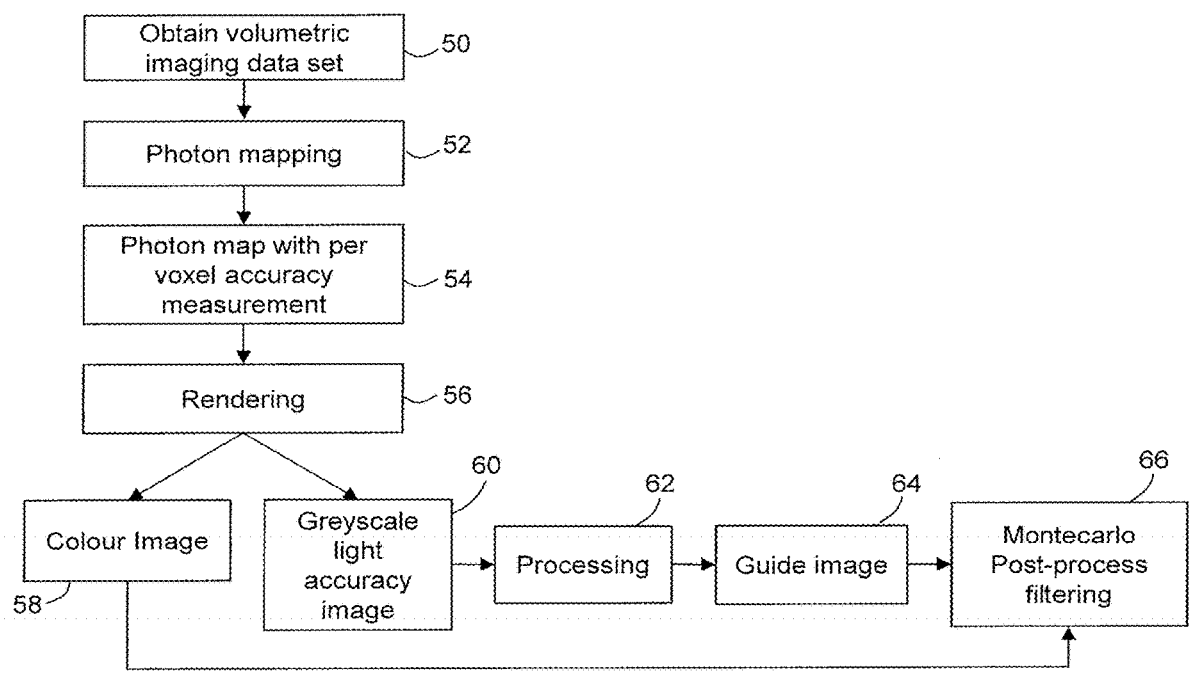
FIG. 4 is a flow chart illustrating a method in accordance with an embodiment.

The system of FIG. 3 is configured to perform a process having a series of stages as illustrated in overview in the flow chart of FIG. 4.

At stage 50, a volumetric imaging data set is obtained by the photon mapping circuitry 34. The volumetric imaging data set is representative of scan data obtained by the ultrasound machine 22 and transducer probe 24. The volumetric imaging data set comprises a plurality of voxels each having associated color (red, green, blue) and opacity (alpha) values. For example, a transfer function may be used to relate an intensity associated with each of the voxels to a corresponding color and opacity.

At stage 52, which may be considered to be the first pass of a two-pass rendering process, the photon mapping circuitry 24 performs a photon mapping on the volumetric imaging data set to obtain an irradiance volume (which may also be described as a light volume or photon volume). The irradiance volume shows light energy distribution in the volume of the volumetric imaging data set. The photon mapping is described in detail below with reference to FIG. 5a.

Figure 5A:
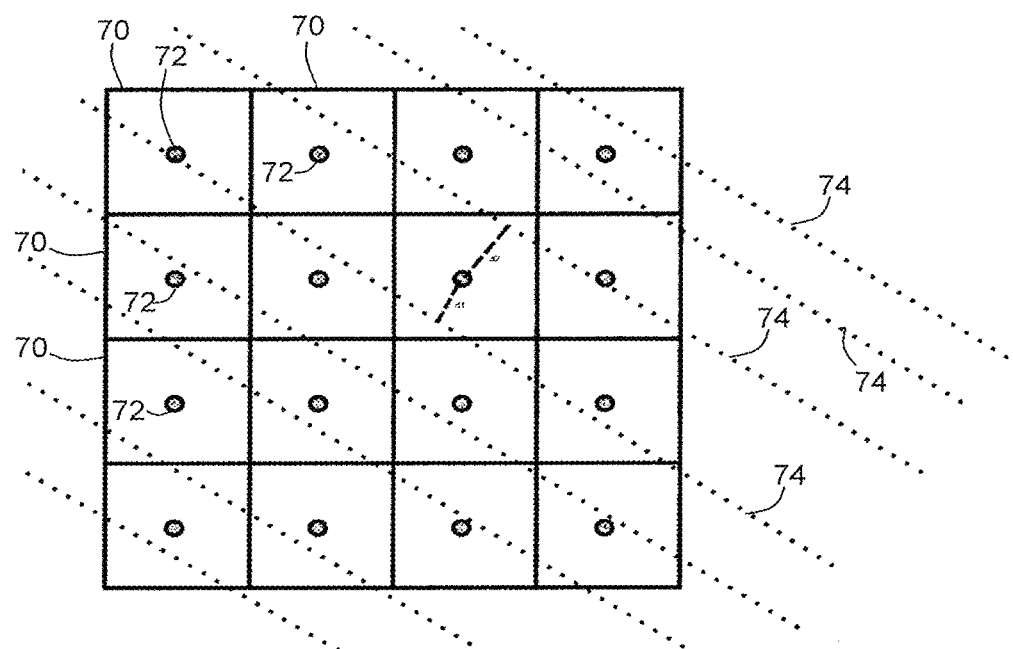
FIG. 5a is a schematic diagram showing the determination of a distance from a nearest simulated photon ray to a voxel center.

FIG. 5a is a schematic diagram which is representative of a slice through the volumetric imaging data set. FIG. 5a shows a plurality of voxels 70 (represented by boxes in FIG. 5a), each having a respective voxel center point 72.

Each of the voxels 70 has an associated absorption function, which is dependent on the opacity value for that voxel. In some embodiments, the absorption function may be color-dependent. For example, blue and green light may be absorbed more strongly than red light.

The photon mapping circuitry 34 determines a reference grid comprising an array of reference points at which irradiance is to be calculated. In the present embodiment, the positions of the reference points are coincident with the positions of the voxel centers 72. We therefore refer to the positions of the voxel centers 72 when describing the calculation of irradiance (and when describing the calculation of accuracy values). In other embodiments, different reference points may be used. For example, irradiance may be calculated on a downsampled grid.

An irradiance volume may be sparse. In a sparse irradiance volume, it may be the case that no irradiance is stored for certain areas, for example for areas for which the irradiance of those areas cannot affect the final image. Storing no irradiance for some areas may save space.

In some embodiments, a complex sparseness logic is used to save the space required for the data structure of the irradiance volume. The irradiance volume may have non-uniform resolution (future direction).

The photon mapping circuitry 34 determines a position of at least one virtual light source (not shown) relative to the volumetric imaging data set. In the schematic diagram of FIG. 5a, a single virtual light source is placed outside the boundary of the volumetric imaging data set.

The photon mapping circuitry 34 simulates the casting of light from the virtual light source into the volumetric imaging data set. The light may be considered as a set of virtual rays 74 radiating from the virtual light source into the volumetric imaging data set. The virtual rays 74 may be referred to as photon rays 74 or virtual photon rays.

In the present embodiment, substantially parallel photon rays 74 are cast from the single virtual light source. In alternative embodiments, photon rays 74 may be cast from the virtual light source at any suitable angles. In further embodiments, any number of virtual light sources may be used. Photon rays 74 may be cast from each virtual light source at any suitable angles.

In the present embodiment, the casting of the photon rays 74 is stochastic. The photon rays 74 are not regularly spaced, but instead are spaced at random intervals. The positioning of the photon rays may be in accordance with at least one stochastic variable with a specific distribution. The positioning of the photon rays may be in accordance with at least one statistical function. The positioning of the photon rays may be random or pseudorandom.

In some embodiments, photons are distributed across the footprint of the light in a random way. However, such a random distribution may not be very efficient.

In other embodiments, photons are placed on a grid and then have a random offset applied in x and y (and optionally in z).

In further embodiments, photons are distributed in a structured quasi-random way, for example using Wang tiles. Wang tiles may provide a way to create a seemingly random distribution for a set of carefully constructed tiles, combined in a way that tiling patterns won't repeat. This gives the appearance of a random distribution of points with a uniform distance between the points (homogeneous). The use of a structured quasi-random distribution may create less artefacts than a regular distribution. Such an approach may be considered to fall under the collective name of blue noise.

Each photon ray 74 is traced from the virtual light source as it interacts with the volumetric imaging data set. As the photon ray 74 traverses the volumetric imaging data set from the virtual light source, it distributes virtual light energy (irradiance) to the local voxel neighborhood around points that it passes through. The irradiance is distributed in accordance with the absorption function of each voxel. Any suitable method may be used to distribute irradiance from points on a photon ray to neighboring voxels. For example, for each of a plurality of points on the photon ray, irradiance may be distributed to the eight nearest-neighbor voxels to that point. Irradiance may be distributed using a weighting method that may be considered to be analogous to tri linear interpolation.

As the photon ray 74 progresses, the amount of light absorbed is computed and when a high proportion of the light of the photon ray 74 has been absorbed (for example, 90%, 95%, 99% or substantially all of the light), the traversal of the photon ray 74 is terminated.

A single voxel 70 may receive light energy from multiple photon rays 74. A single voxel 70 may receive light energy from photon rays 74 originating from multiple virtual light sources.

In the present embodiment, the photon mapping process of stage 52 simulates scattering as well as direct illumination. Some photons may be scattered rather than absorbed. In some embodiments, only single scattering is taken into account. In some embodiments, multiple scattering is taken into account. In some embodiments, reflection is also taken into account.

The result of the photon mapping process of stage 52 is an irradiance volume in which each of a plurality of reference points (in this embodiment, voxel centers 72) is associated with a respective irradiance value. In this description, for simplicity we refer to a single irradiance value per reference point. However, in some embodiments, separate irradiance values may be calculated for each color (e.g. red, green and blue).

The irradiance volume is independent of the viewpoint and depends only on the virtual light source position and the voxel properties. Therefore the computation of the irradiance volume is capable of being used for multiple renderings from different viewpoints. It is possible to query the irradiance at any point in the irradiance volume.

At stage 54 of the process of FIG. 4, the photon mapping circuitry 34 calculates, for each voxel, a value for an accuracy measure. The value for the accuracy measure may also be referred to as an accuracy value, a lighting accuracy measurement or a voxel lighting accuracy factor. The accuracy measure may also be referred to as a measure of lighting quality, a measure of convergence, a measure of entropy.

The accuracy measure for a voxel may be considered to representative of an accuracy of the determined irradiance value for that voxel. The determined irradiance value is accumulated from the photon rays 74 that pass near to the voxel. It may therefore be the case that irradiance values are less accurate for voxels in regions through which a smaller number of photon rays 74 have passed. Since increasing the number of photon rays 74 passing into the volume may increase the accuracy of the irradiance, the accuracy measure may also be considered to measure convergence. Values for the accuracy measure may increase with increased iterations.

Any suitable accuracy measure may be used to represent the accuracy of the determined irradiance values. The accuracy measure may be a measure of the number of photon rays 74 passing near to each voxel. The accuracy measure at a given point may be considered to be a measure of the accuracy of the irradiance calculation at that point, or near that point (for example, in a local region surrounding that point).

Figure 5B:
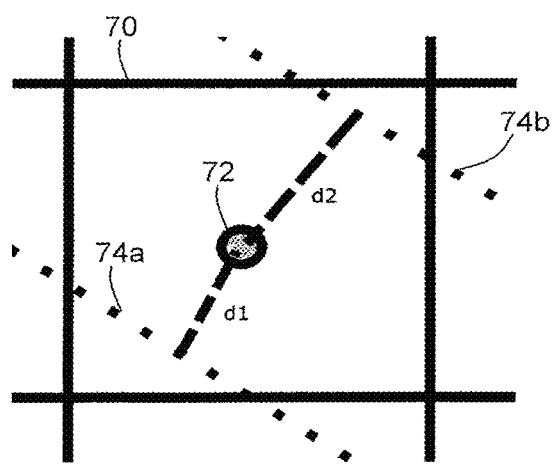

In the present embodiment (which is illustrated in FIG. 5b), the distance to the nearest simulated photon ray 74 is used as an accuracy measure. FIG. 5b shows an enlarged section of the schematic illustration of FIG. 5a, which shows one of the voxels 70 of FIG. 5a in greater detail. In the example shown in FIG. 5b, two photon rays 74a, 74b have passed through the voxel 70. The value for the accuracy measure is the distance from the voxel center 72 to the nearest photon ray 74a.

The photon mapping circuitry 34 calculates a distance d1 from the voxel centre 72 to the nearest point on the first photon ray 74a. The photon mapping circuitry 34 calculates a distance d2 from the voxel center 72 to the nearest point on the second photon ray 74b. Distances d1, d2 are shown on FIG. 5b.

The photon mapping circuitry 34 then selects the smaller of the distances d1, d2. In this example, the smaller distance is d1. The photon mapping circuitry 34 therefore sets the accuracy value for this voxel to be d1.

The photon mapping circuitry 34 determines a respective value for the accuracy measure for each of the voxels in the volumetric imaging data set by determining the distance from the voxel center 72 to each nearby photon ray 74 and selecting the smallest distance. This is based on the Euclidian distance between the photon sample location and the center of the voxel it wishes to write to. The Euclidean distance is calculated as:

$$\sqrt{(x\_photon - x\_voxel)^2 + (y\_photon - y\_voxel)^2 + (z\_photon - z\_voxel)^2}$$

where (x_photon, y_photon, z_photon) are the coordinates of the photon sample and (x_voxel, y_voxel, z_voxel) are the coordinates of the voxel.

In other embodiments, any suitable accuracy measure or combination of accuracy measures may be used. In some embodiments, the accuracy measure is a photon ray density in a local region. For each voxel, the photon mapping circuitry 34 calculates a density of photon rays 74 in a local region surrounding that voxel. The local region may comprise, for example a block of voxels around that voxel.

In the present embodiment, the photon mapping circuitry 34 calculates a respective value for the accuracy measure for each voxel in the volumetric imaging data set. In other embodiments, the photon mapping circuitry 34 may calculate a respective value for the accuracy measure for each of a set of reference points. The reference points for which the accuracy measure is calculated may not coincide with the voxel centers 72. In some embodiments, the set of reference points may comprises a downsampled version of the set of voxels. In some embodiments, a different set of reference points may be used to calculate values for the accuracy measure than is used to calculate irradiance values.

The output of stage 54 is an irradiance volume which comprises a respective accuracy value for each voxel (or, in other embodiments, a respective accuracy value for each reference point). The irradiance volume is stored in the data store 40.

In the present embodiment, the accuracy values for the voxels are stored in the irradiance volume. In other embodiments, the accuracy values may be stored in a further data structure instead of or in addition to being stored in the irradiance volume.

In the present embodiment, stage 54 is performed after the completion of stage 52. In further embodiments, stage 52 and 54 may be performed substantially simultaneously, or may overlap.

At stage 56 (which may be described as a rendering process, or as the second pass in a two-pass rendering process) the rendering circuitry 36 renders two images 58, 60 using the irradiance volume and the volumetric imaging data set.

The first image is a color image 58. The color image 58 is represented by a first two-dimensional image data set comprising a respective color value for each of a two-dimensional array of pixels. The color image 58 may also be referred to as a 3D image, since the color image 58 is rendered such that a subject of the image appears to be three-dimensional.

The second image is a greyscale image 60, which may be described as a light accuracy image. The second image is represented by a second two-dimensional image data set comprising a respective greyscale value for each of the two-dimensional array of pixels, where the greyscale value for each pixel is representative of an accuracy value for that pixel. The second image may be described as a mask containing an accuracy value per pixel.

In the present embodiment, the color image 58 and greyscale light accuracy image 60 are rendered at the same resolution. In other embodiment, the greyscale light accuracy image 60 may be rendered at a lower resolution than the color image 58.

In the present embodiment, the rendering circuitry 36 renders both the first image and the second image using a single rendering process.

The position of a camera and a gaze direction are defined by the rendering circuitry 36. The camera position may be described as a viewing position. A two-dimensional viewing plane may be defined based on the camera position and the gaze direction (which may also be called a viewing direction).

The rendering circuitry 36 casts rays into the volumetric imaging data set from the direction of the camera. The rays that are cast into the volume by the rendering circuitry 36 may be referred to as sample rays. Each sample ray corresponds to a respective pixel of the first image. In the present embodiment, the first image and second image have the same resolution, so each sample ray also corresponds to a respective pixel of the second image.

Each sample ray samples the volume at a plurality of sample points along the sample ray.

Color values and accuracy values are determined at each sample point. In the present embodiment, the color values and accuracy values are determined from the color values and accuracy values of neighboring voxels using trilinear interpolation. In other embodiments, any suitable method may be used to determine color values and accuracy values of the sample points using color values and accuracy values of neighboring voxels or reference points.

Figure 6:
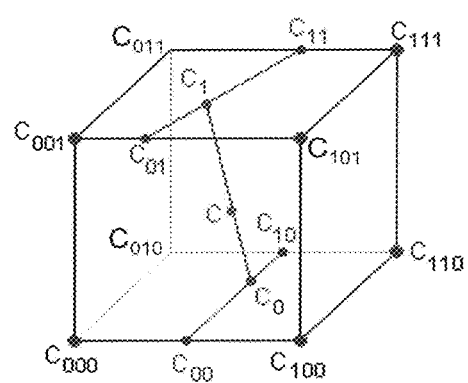
FIG. 6 is a schematic diagram representing trilinear interpolation.

FIG. 6 is a schematic illustration of trilinear interpolation. We consider the determining of an accuracy value for a point C using trilinear interpolation of accuracy values for surrounding voxels $C_{000}$, $C_{100}$, $C_{110}$, $C_{010}$, $C_{001}$, $C_{101}$, $C_{111}$, $C_{011}$. The determining of each color value for the point C is also determined by trilinear interpolation in a similar manner.

A linear interpolation of the values for $C_{000}$, $C_{100}$ is performed in the x direction, giving a value for a point indicated as $C_{00}$. A linear interpolation of the values for $C_{010}$, $C_{110}$ is performed in the x direction, giving a value for a point indicated as $C_{10}$. A linear interpolation of $C_{00}$ and $C_{10}$ in the y direction gives a value for a point $C_0$.

A linear interpolation of the values for $C_{001}$, $C_{101}$ is performed in the x direction, giving a value for a point indicated as $C_{01}$. A linear interpolation of the values for $C_{011}$, $C_{111}$ is performed in the x direction, giving a value for a point indicated as $C_{11}$. A linear interpolation of $C_{01}$ and $C_{11}$ in the y direction gives a value for a point $C_1$.

A linear interpolation is then performed of the values for $C_0$ and $C_1$ in the z direction to give a value for point C. The value for the point C is therefore obtained by trilinear interpolation.

The trilinear interpolation process may be expressed by the equation:

Voxel lighting accuracy factor=Sum(Trilinear Weight [i]*(1−voxel accuracy factor[i]))/8 where i is in a range from 1 to 8, and voxel accuracy factor[i] is the value for the accuracy measure for the ith voxel of the 8 voxels surrounding the sampling point.

A similar trilinear interpolation process is used to obtain color values for each sample point. The color values of each voxel (or reference point) in the irradiance volume may also be referred to as irradiance values.

In other embodiments, any type of interpolation may be performed. A value at an interpolation point may comprise a weighted sum of the voxel neighbors, where the weights are determined by the spatial location of the interpolation point in respect to the neighbors:

$$value = \sum_{i=[0,7]} w_i * voxel_i$$

where value is the value at the interpolation point, $w_i$ is the weight for the ith voxel, and $voxel_i$ is the value for the ith voxel.

In some embodiments, the values of the accuracy measure are used to bias the interpolation of irradiance values, such that the interpolation biases towards the irradiance values of the voxels having higher values of the accuracy measure.

For example, a quality weight may be added to the interpolation equation.

$$value = \sum_{i=[0,7]} w_i * q_i * voxel_i / \sum_{i=[0,7]} q_i$$

where $q_i$ is a function of one or more accuracy measures (for example, accuracy measures as described above).

For each pixel of the two-dimensional array of pixels, the rendering circuitry 36 accumulates a final pixel color according to a summation of color and opacity values along the sample ray for that pixel. For each color component RGB, the rendering circuitry 36 calculates a final value for that color using:

$$C_{final} = \sum_{i=1}^{N} C_i \alpha_i \prod_{j=0}^{i-1} (1 - \alpha_j)$$

where $C_{final}$ is the final pixel color, N is the number of sampled points on the sample ray for that pixel, $C_i$ is the pixel color at sample i and $\alpha_i$ is the opacity at sample i.

For each pixel of the two-dimensional array of pixels, the rendering circuitry 36 accumulates a final accuracy value according to a summation of accuracy values and opacity values along the sample ray for that pixel.

The accuracy value for the pixel, which may also be described as a pixel accuracy value or a pixel lighting accuracy factor, may be written as:

Pixel lighting accuracy factor=(1−accumulated opacity)*voxel lighting accuracy factor The rendering circuitry 36 calculates a final value for the accuracy measure using:

$$Accuracy_{final} = \sum_{i=1}^{N} Accuracy_i \alpha_i \prod_{j=0}^{i-1} (1 - \alpha_j)$$

where $Accuracy_{final}$ is the final accuracy value, N is the number of sampled points on the ray, $Accuracy_i$ is the accuracy value at sample i as determined at stage 54 and $\alpha_i$ is the opacity at sample i.

Similar processes of integration are applied to both color and accuracy. It may be considered that accuracy is treated as if it were a fourth color. Accuracy values that are stored in the irradiance volume[1] are treated in a similar manner to the color values that are stored in the volumetric imaging data set.

The rendering circuitry 36 calculates respective color and accuracy values for each pixel using sample rays as described above. The rendering circuitry 36 thereby determines a color value for each pixel in the two-dimensional image data set of the color image 58, and a value for the accuracy measure for each pixel in the two-dimensional image data set of the greyscale light accuracy image 60. In other embodiments, more than one sample ray per pixel may be used. Multiple accuracy and/or color values may contribute to each pixel of the color image 58 and/or greyscale light accuracy image 60. In further embodiments, light accuracy may be determined at a lower resolution than color. For example, accuracy values may be determined for two dimensional grid of points that has a lower resolution than the grid of pixels in the color image 58.

Optionally, the rendering circuitry 36 may display the color image 58 on the main display screen 26 or on a further screen. In some embodiments, a rendering process is performed at stage 56 as described above, but no image is displayed.

Figure 7A:
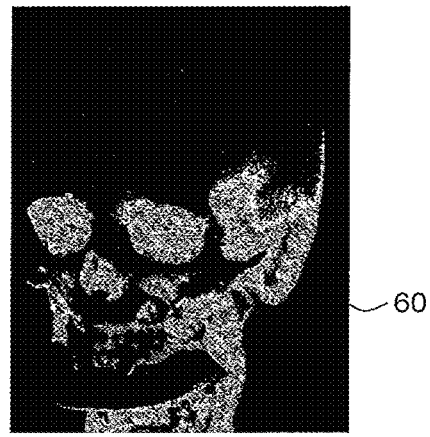
FIG. 7a is a volume rendered map of regions of inaccurate lighting.

FIG. 7a shows an example of a greyscale light accuracy image 60. In FIG. 7a, the greyscale light accuracy image 60 is an image of a skull. The greyscale light accuracy image 60 may also be described as a volume rendered map of inaccurate lighting.

In FIG. 7a, pixels having a lower value for accuracy are shown in white. Pixels having a higher value for accuracy are shown in dark grey.

Pixels for which no information is available (which may be described as having a zero accuracy value) are shown in pale grey (if they are inside the skull) or black (if they are in the background).

It may be seen that the lower-accuracy pixels are clustered in certain areas of the image. Some of those areas may be areas that would appear to be in shadow in the corresponding color image. However, it may not always be the case that shadowed areas are lower accuracy (or that lower accuracy areas are shadowed). Low accuracy regions may appear on surfaces that are not in shadow but are angled away from the light. Low accuracy regions may also occur when the path of the light is simulated with refraction/reflection or scattering, in which light may have a large degree of intensity variation. In some circumstances, there may be a light where the photons diverge. Regions near the light may have many photons per volumetric region. Regions further away from the light may have a lower count per volume, without any absorption taking place.

In general, global illumination has the property that a small change in structure may cause a large change in the irradiance volume. Therefore, even though the areas of lower-accuracy pixels may look superficially as though they are structure dependent, it may be the case that the positioning of the lower-accuracy pixels would change significantly from frame to frame even if a movement from frame to frame is small.

The lower-accuracy pixels are somewhat scattered and do not form solid regions of lower accuracy. At stage 62, the filtering circuitry 38 processes the greyscale light accuracy image 60 to produce a guide image 64. The guide image 64 comprises a set of regions of the image that are identified as regions of lower accuracy.

In the present embodiment, the processing of stage 62 comprises a threshold step, a dilation step and a smoothing step.

In the threshold step, the filtering circuitry 38 applies a threshold to the values of the accuracy measure. The filtering circuitry 38 selects the pixels of the greyscale light accuracy image 60 that have a value of the accuracy measure that is greater than zero and less than a threshold value. Any suitable threshold value may be selected.

Figure 7B:
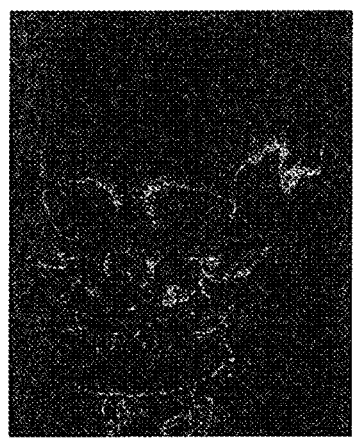
FIG. 7b is a version of the image of FIG. 7a after a threshold is applied to the image.

FIG. 7b shows the pixels that have been selected by thresholding in white. The remaining pixels are shown as medium grey in FIG. 7b.

In the present embodiment, a single threshold is used to identify lower-accuracy pixels. In further embodiments, more than one threshold may be used. For example, a first threshold value may be used to identify lower-accuracy pixels and a second, higher threshold value may be used to identify medium-accuracy pixels.

Figure 7C:
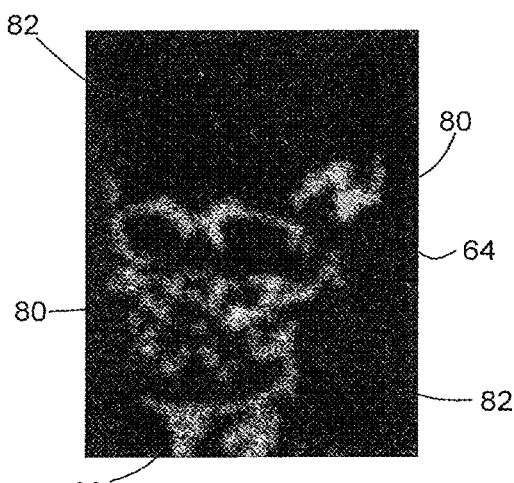
FIG. 7c is a version of the image of FIG. 7b in which thresholded pixels have been dilated and smoothed to obtain a final guide image.

In the dilation step, the filtering circuitry 38 dilates the selected pixels (which in this embodiment are the lower-accuracy pixels identified using the threshold). In the smoothing step, the filtering circuitry 38 smooths the dilated pixels to obtain the guide image 64. FIG. 7c shows the guide image 64. It may be seen that the guide image 64 comprises a set of pale grey regions 80. The pale grey regions 80 may be referred to as lower-accuracy regions 80. The lower-accuracy regions 80 comprise a dilated and smoothed version of the white pixels of FIGS. 7a and 7b.

In other embodiments, any suitable processing may be applied to the greyscale light accuracy image 60 to obtain the guide image 64. For example, any combination of thresholding, dilation and filtering (for example, smoothing) may be used. The guide image 64 comprises at least one lower-accuracy region 80. The guide image 64 also comprises at least one further region 82 (represented by medium grey in FIG. 7c) which is not a lower-accuracy region.

The lower-accuracy regions 80 are regions in which a significant proportion of the pixels have relatively low values for the accuracy measure, for example values below the threshold value for the accuracy measure.

Returning to the flow chart of FIG. 4, at stage 66 the filtering circuitry 38 filters the color image 58 using the guide image 64. The filtering circuitry 38 displays the filtered image on the main display screen 26. In other embodiments, the filtered image may be displayed on a different screen, or may not be displayed at all. In some embodiments, the guide image 64 is also displayed. For example, in some embodiments, the guide image 64 is displayed alongside the filtered image and/or the original color image 58.

The filtering circuitry 38 uses the lower-accuracy regions 80 and further regions 82 of the guide image 64 to identify corresponding lower-accuracy regions 80 and further regions 82 of the color image 58. In the present embodiment, the guide image 64 and color image 58 have the same number of pixels and so each pixel of the guide image 64 maps directly on to the corresponding pixel of the color image 58. The lower-accuracy regions 80 and further regions 82 of the guide image 64 may be mapped directly onto the color image 58. In other embodiments, the guide image 64 and color image 58 may have different numbers of pixels. For example, the guide image 64 and color image 58 may be determined at different resolutions.

The filtering circuitry 38 filters the lower-accuracy regions 80 of the color image 58 using a first filter. In the present embodiment, the first filter is a diffusion filter.

The filtering circuitry 38 filters the further regions 82 of the color image 58 using a second filter. In the present embodiment, the second filter is also a diffusion filter. However, the first filter and second filter have different values for at least one parameters. In particular, the first filter has a higher value for a strength parameter, such that the first filter is stronger than the second filter.

The filtering circuitry 38 therefore filters the lower-accuracy regions 80 more aggressively than the further regions 82.

The lower-accuracy regions 80 comprise pixels that have been identified as having relatively low accuracy, which may also be described as low lighting quality. It may be expected that the lower-accuracy regions may have relatively low information content. Therefore, it may be less likely that information will be lost by filtering the lower-accuracy regions 80 than could be lost by filtering the further regions 82.

By filtering the lower-accuracy regions 80 more strongly than the further regions 82, information in the further regions 82 may be retained, while noise is removed from the lower-accuracy regions 80. The lower-accuracy regions 80 may be likely to be regions in which a greater amount of noise is present.

In other embodiments, the filtering circuitry 38 may filter the lower-accuracy regions 80 using any appropriate first filter. The filtering circuitry 38 may filter the further regions 82 using any appropriate second, different filter. The terms filtering and filter may refer to any process that alters at least part of the color image 58, for example any smoothing process.

In some embodiments, the first and second filters are the same type of filter, but with different parameter values. For example, the first and second filters may both be diffusion filters, and a value for a strength parameter of the first filter may be greater than the value for that strength parameter in the second filter. The guide image may be used to modify the partial differential equation of a diffusion filter.

The first and second filters may both be non-local means filters, and a value for a strength parameter of the first non-local means filter may be greater than the value for that strength parameter in the second non-local means filter. The guide image may be used to modify a window, search window and/or filter strength of a non-local means filter.

In some embodiments, the first filter and second filter are bilateral filters. A bilateral filter may have constraints such that it does not filter across boundaries. The positioning of those boundaries may be modulated in dependence on the guide image 64.

In further embodiments, the first filter and second filter are different types of filter. For example, the first filter may be a diffusion filter and the second filter may be a bilateral filter. A sigma factor of the bilateral filter may be modified between the first filter and the second filter.

The first filter and/or second filter may comprise any suitable type of filter, for example a diffusion filter, a bilateral filter, or a non-local means filter.

In further embodiments, the filtering circuitry 38 applies a filtering process differently to the lower-accuracy regions 80 than to the further regions 82. For example, a filter may be applies to the lower-accuracy regions 80 that is not applied to the further regions 82. The guide image 64 may be used to locally switch between two or more filtering algorithms.

In the embodiment shown in FIG. 7c, a set of lower-accuracy regions 80 are identified in the guide image 64. The remainder of the guide image 64 is identified a further region or regions 82.

In other embodiments, the further region or regions 82 may not cover the entirety of the remainder of the guide image 64. In some embodiments, certain regions may not be filtered at all (for example, regions that only show background). In some embodiments, multiple sets of regions are identified (for example, lower-accuracy, medium-accuracy and higher-accuracy regions) and a different filter is applied to each set of regions. Different regions or sets of regions are filtered differently depending on the calculated accuracy of pixels within those regions. In some embodiments, a user may select and/or modify a threshold value, for example to obtain a preferred balance between grainy noise and detail.

Although a particular method of identifying lower-accuracy regions is described above in relation to FIG. 4, in other embodiments any method of identifying lower-accuracy regions may be used.

By filtering regions of different accuracy in a different manner, a balance may be achieved between stronger and weaker filtering. Stronger filtering may remove more noise from noisy regions, but may reduce a level of detail in other regions. Weaker filtering may preserve more detail, but may not remove so much noise. Using different filters in different regions may allow more noise reduction in noisy regions without a reduction of detail in other regions. The method of FIG. 4 may provide a method of filtering that discriminates between regions having different accuracies.

The method of identifying lower-accuracy regions described above with reference to FIG. 4 may provide a method of correctly identifying lower-accuracy regions. The method of identifying lower-accuracy regions may be appropriate to the stochastic context. Accuracy may be determined based on a number, distance or density of photon rays. Accuracy may therefore be seen to improve as a number of photon rays is increased.

The method of identifying lower-accuracy regions may incur a very low computational cost. Accuracy may be integrated in a similar manner to color. There may be substantially no increase in computational cost when adding the calculation of accuracy. The method of identifying lower-accuracy regions may incur only a small increase in data storage requirement.

The method of FIG. 4 may be far faster than a more complex filtering, for example filtering of a three-dimensional volume. The method of FIG. 4 may provide a faster method of improving an image than would be provided by performing additional iterations. The method of FIG. 4 may produce improved images at low computational cost.

It is expected that the use of more complex global illumination algorithms may result in the presence of a greater amount of grainy noise. The method of FIG. 4 may be particularly relevant to advanced global illumination algorithms.

Image produced using the method of FIG. 4 may be easier for a user to interpret. The images may be more aesthetically pleasing (which may be relevant in, for example, fetal ultrasound imaging).

Improved images may be obtained even while rendering the images in real time. In some circumstances, the method of FIG. 4 may provide real time extremely low latency filtering, for example filtering taking 5 ms or less.

In some known scenarios, movement of a subject or an image and/or interaction of a user with an image (for example, changing image parameters) may cause a quality of the image to be degraded for a short period. It may be the case that the parameters used to render the image need to be stable for a period of time to allow the rendering circuitry to iterate to a better image.

In some circumstances, the method of FIG. 4 may be used to improve the quality of initial images that are produced before the rendering has had a chance to iterate, for example images that are produced following a movement or parameter change. Using the method of FIG. 4 to apply more filtering to lower-accuracy regions of the image may mean that some such regions start by looking smooth (when there is little information, and therefore a strong filtering is applied) and then become sharper and/or more detailed as the information content increases.

If a subject moves, the entire image may be re-rendered. A small change in the subject may lead to a large change in irradiance volume. Using the method of FIG. 4 may allow an acceptable image to be produced very rapidly.

In some embodiments, the processing of the greyscale light accuracy image 60 to form the guide image 64 may be in dependence on motion. For example, if the subject is moving from frame to frame, the guide image 64 may be blurred in dependence on the motion between the frame for which the guide image 64 is determined and the previous frame (or multiple previous frames). If the subject of the image is moving from right to left, the guide image 64 may be blurred in the same direction.

Figure 8A:
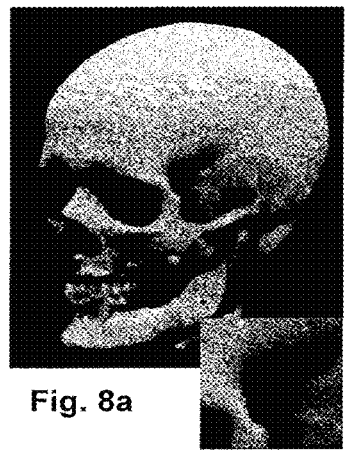
FIG. 8a is an image having high profile post-process filtering.
Figure 8B:
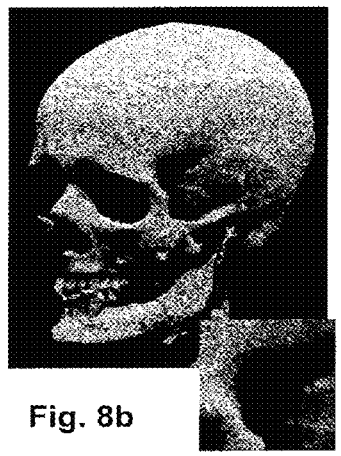
FIG. 8b is an image having medium profile post-process filtering.
Figure 8C:
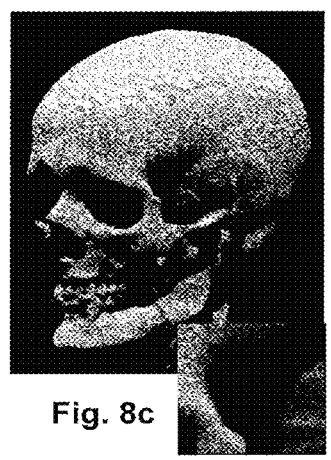
FIG. 8c is an image that has been filtered in accordance with an embodiment.

A comparison of filtering using the method of FIG. 4 against filtering using a single filter for the entire image is provided in FIGS. 8a to 8c.

Figure 1A:
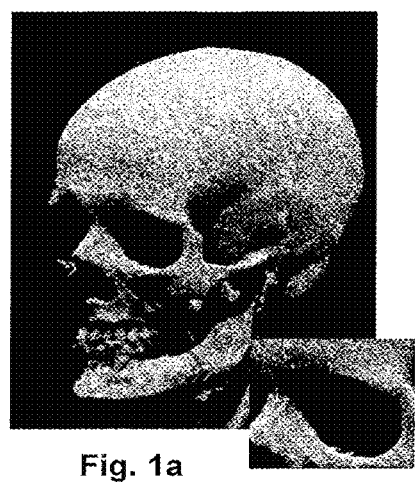
FIGS. 1a, 1b and 1c are images produced using a stochastic simulation with 1 photon mapping pass (FIG. 1a), 2 photon mapping passes (FIG. 1b) and 32 photon mapping passes (FIG. 1c) respectively.
Figure 1B:
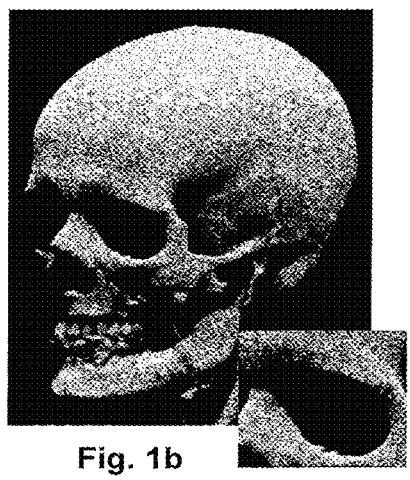
Figure 1C:
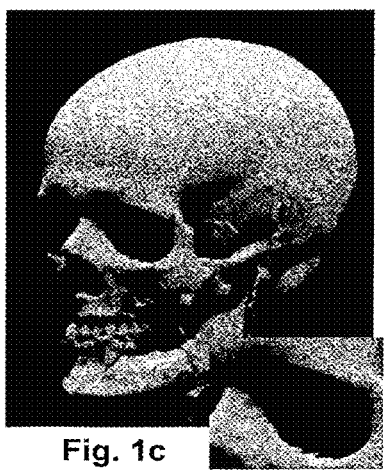
Figure 2A:
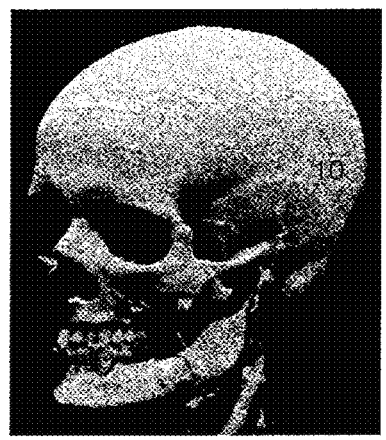
FIG. 2a is an image without post-process filtering.
Figure 2B:
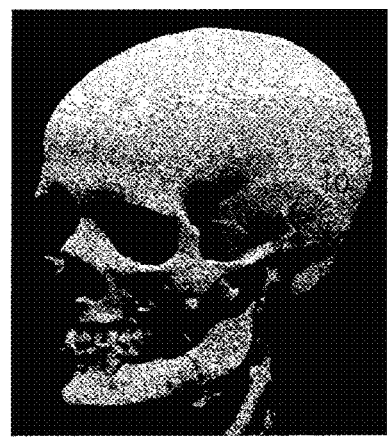
FIG. 2b is an image with medium profile post-process filtering.
Figure 2C:
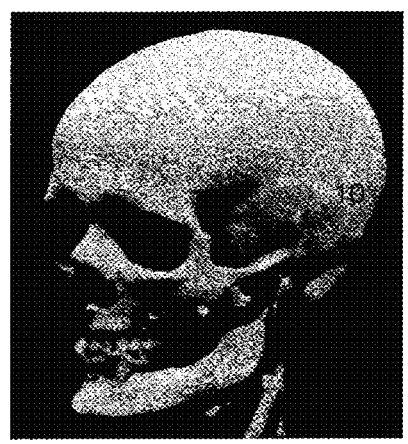
FIG. 2c is an image with high profile post-process filtering.

FIG. 8a is an image that is filtered with a high-profile filter across the entire image. The image of FIG. 8a is similar to the image of FIG. 2c. As described above with reference to FIG. 2c, some detail is lost due to the strength of the filtering.

FIG. 8b is an image that is filtered with a medium profile filter across the entire image. The image of FIG. 8b is similar to the image of FIG. 2b. As described above with reference to FIG. 2b, less detail is lost in the image of FIG. 8b than in the image of FIG. 8a. However, some grainy noise remains.

FIG. 8c is an image that is filtered using the filtering method described above with reference to FIG. 4. It may be seen that detail is retained in higher-accuracy regions, while noise is removed from lower-accuracy regions.

In summary, a specific accuracy measurement is included as part of the photon mapping. The accuracy is volume rendered and processed into a guide image for use in post process filtering. Alongside the normal rendering process, we accumulate an image highlighting areas where low accuracy lighting significantly affected the pixel. The accumulation of this image may be very inexpensive. The interpolation may already take this information into account. The image is processed to generate a smooth guide image representing the overall filtering requirements. A threshold is followed by a grey dilate which may be followed by a Gaussian filter.

The guide image may be used as a guide for the filtering process by modifying a diffusion PDE to disregard edges within regions of low convergence. Edges within regions of the convergence may be noise. The guide may be used to modify a diffusion filter, a bilateral filter, or non-local means filter. The guide may be used to switch between filters based on the guide image.

The pixel accuracy values may be obtained substantially without extra computational cost. Accuracy may be treated substantially as if it were another color.

In a further embodiment, the determined values for the accuracy measure of pixels in an image are used to determine whether that image has been rendered at a high enough resolution, or whether the rendering needs to be refined.

Values for the accuracy measure for the pixels of the image are determined as described above with reference to FIG. 4. Values for the accuracy measure are determined for each of a plurality of voxels or reference points in an irradiance volume. When an image is rendered from the irradiance volume, the values for the accuracy measure are integrated in a similar manner to the color values for obtain a respective accuracy value for each pixel.

The rendering circuitry 36 then processes the accuracy values for the pixel to determine whether the image as a whole has a high enough accuracy. For example, the rendering circuitry 36 may sum or average the accuracy values for the pixels of the image. The rendering circuitry 36 may count how many pixels have an accuracy value below a desired threshold value.

If the rendering circuitry 36 determines that the image does not have a high enough accuracy, a further iteration may be performed. For example, the photon mapping circuitry 34 may introduce further photon rays 74 into the volume of the volumetric imaging data set.

The rendering circuitry 36 may determine whether the image has a high enough accuracy using the greyscale light accuracy image 60 or a processed version of the greyscale light accuracy image 60.

In some embodiments, the greyscale light accuracy image 60 is used to determine if the scene needs to be refined at a higher resolution in addition to being used to obtain a guide image 64 to perform different filtering on different regions.

In further embodiments, no guide image 64 is obtained. If the overall accuracy of the image is determined to be relatively low, the scene is refined at a higher resolution. The image may then be filtered using a single filter across the entire image.

In the discussion above, processes may be referred to as if they occurred in a physical space (for example, light rays passing through a volume, or light reflecting from a surface). However, in the case of illumination, we are usually describing virtual (simulated) processes occurring as numerical operations on a volumetric image data set. Similarly, when we discuss the volumetric image data set as if it were a physical space having a physical extent, we are generally referring to the coordinate space that is represented by the voxels of the image volume.

In the discussion above, we refer to processing of an image. In practice, the processing of the image may comprise processing of a two-dimensional data set that is representative of the image. In some circumstances, the data that is representative of the data is processed without the image being displayed. The image may or may not be displayed before, during, or after the processing of the image.

Embodiments above describe the rendering of medical imaging data using the method of FIG. 4. The medical imaging data may comprise imaging data of any suitable modality obtained by a medical imaging scan of any human or animal patient or other subject. In other embodiments, the method of FIG. 4 may be used to render any volumetric imaging data, which may not be medical. The method may provide real time extremely low latency filtering, for example filtering taking 5 ms or less.

Certain embodiments provide a medical imaging method comprising: a stochastic lighting simulation; a rendering pass using the result of lighting simulation; a lighting data structure that stores an accuracy factor; in which the interpolated accuracy factor is volume rendered as a 4th color channel using the main opacity to form a lighting quality image.

The lighting quality image may be processed to find large areas of poor lighting accuracy. The processed lighting quality image may be used to apply a 2D image filter more aggressively in areas of poor lighting accuracy. The lighting quality image may be used to modify the partial differential equation of a diffusion filter. The lighting quality image may be used to locally modulate sigma factor in a bilateral filter. The lighting quality image may be used to locally modify a window, search window and filter strength of a non-local means filter. The lighting quality image may be used to locally switch between two or more filtering algorithms. The lighting quality image may be used to determine if the scene needs to be refined at a higher resolution.

The embodiments above are described with reference to a global illumination process. In other embodiments, the method described above may be applied to any suitable rendering method, for example a rendering method using at least one of global illumination, photon mapping, light space volume traversal, deep shadow maps, half angle slicing, light propagation volumes or shadow propagation volumes.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image processing apparatus comprising:
   processing circuitry configured to:
   obtain an irradiance volume representative of virtual light cast into a volumetric imaging data set, the irradiance volume comprising a respective irradiance value for each of a plurality of points in the irradiance volume;
   determine, for each of a plurality of reference points in the irradiance volume, a respective value for an accuracy measure, wherein the value for the accuracy measure at each reference point is representative of an accuracy with which irradiance has been determined at or near that reference point; and
   perform a rendering process using the irradiance volume, wherein the rendering process is performed in dependence on the determined values for the accuracy measure, and wherein the rendering process further comprises:
   rendering an image from the irradiance volume,
   determining a respective pixel accuracy value for each of a plurality of pixels in the rendered image based on the determined values for the accuracy measure for the plurality of reference points,
   determining, based on the pixel accuracy values, at least one lower-accuracy region of the image, and
   applying a filtering process to the image, wherein the applying of the filtering process is at least partially different for the lower-accuracy region of the image than for at least one further region of the image.

2. The apparatus according to claim 1, wherein the irradiance volume is obtained from the volumetric imaging data set using stochastic lighting simulation.

3. The apparatus according to claim 1, wherein the rendering process further comprises determining whether to refine the image at a higher resolution based on at least some of the determined pixel accuracy values.

4. The apparatus according to claim 1, wherein, for each pixel, the determining of the pixel accuracy value for that pixel comprises:
   casting a respective sample ray into the irradiance volume; and
   accumulating values for the accuracy measure along said respective sample ray to obtain the pixel accuracy value for the pixel.

5. The apparatus according to claim 4, wherein accumulating values for the accuracy measure along said respective sample ray comprises, for each of a plurality of sample points along said respective sample ray:
   determining a value for the accuracy measure at the sample point based on the values for the accuracy measure at neighboring reference points; and
   calculating $$Accuracy_{final} = \sum_{i=1}^{N} Accuracy_i \alpha_i \prod_{j=0}^{i-1} (1 - \alpha_j)$$

where $Accuracy_{final}$ is the pixel accuracy value for the sample ray, N is the number of sample points on the sample ray, $Accuracy_i$ is the value for the accuracy measure at sample point i of the sample ray, and $\alpha_i$ is a value for opacity at sample point i of the sample ray.

6. The apparatus according to claim 4, wherein the processing circuitry is further configured to determine a color value for each pixel by accumulating color values along the sample rays.

7. The apparatus according to claim 1, wherein the processing circuitry is configured to obtain the irradiance volume by casting a plurality of virtual photon rays into the volumetric imaging data set.

8. The apparatus according to claim 7, wherein the determining of the values for the accuracy measure is in dependence on positions of the virtual photon rays.

9. The apparatus according to claim 8, wherein the accuracy measure comprises a distance to a nearest one of the plurality of virtual photon rays.

10. The apparatus according to claim 8, wherein the accuracy measure comprises a local density of virtual photon rays.

11. The apparatus according to claim 1, wherein the applying of the filtering process to the image comprises filtering the at least one lower-accuracy region more strongly than the at least one further region.

12. The apparatus according to claim 1, wherein the applying of the filtering process to the image comprises modifying at least one parameter of a filter such that it differs between the at least one lower-accuracy region and the at least one further region.

13. The apparatus according to claim 12, wherein the filter comprises at least one of a diffusion filter, a bilateral filter, a non-local means filter.

14. The apparatus according to claim 1, wherein the applying of the filtering process to the image comprises applying a diffusion filter to the image, wherein a value for a strength parameter of the diffusion filter in the at least one lower-accuracy region is different from the value for the strength parameter of the diffusion filter in the at least one further region.

15. The apparatus according to claim 1, wherein the applying of the filtering process to the image comprises using a first filter on the at least one lower-accuracy region and using a second, different filter on the at least one further region.

16. The apparatus according to claim 1, wherein the determining of the at least one lower-accuracy region of the image comprises processing the determined pixel accuracy values to obtain a guide image that is representative of the at least one lower-accuracy region.

17. The apparatus according to claim 16, wherein the processing of the determined pixel accuracy values comprises thresholding the pixel accuracy values to obtain a set of lower-accuracy pixels, and dilating and/or smoothing the set of lower-accuracy pixels to obtain the guide image.

18. An image processing method comprising:
   obtaining an irradiance volume representative of virtual light cast into a volumetric imaging data set, the irradiance volume comprising a respective irradiance value for each of a plurality of points in the irradiance volume;
   determining, for each of a plurality of reference points in the irradiance volume, a respective value for an accuracy measure, wherein the value for the accuracy measure at each reference point is representative of an accuracy with which irradiance has been determined at or near that reference point; and
   performing a rendering process using the irradiance volume, wherein the rendering process is performed in dependence on the determined values for the accuracy measure, wherein the rendering process further comprises:
   rendering an image from the irradiance volume,
   determining a respective pixel accuracy value for each of a plurality of pixels in the rendered image based on the determined values for the accuracy measure for the plurality of reference points,
   determining, based on the pixel accuracy values, at least one lower-accuracy region of the image, and
   applying a filtering process to the image, wherein the applying of the filtering process is at least partially different for the lower-accuracy region of the image than for at least one further region of the image.

* * * * *